V. M. HARRIS.
REFLEX CAMERA.
APPLICATION FILED SEPT. 23, 1918.

1,352,449.

Patented Sept. 14, 1920.

Inventor
Varian M. Harris
by Zabel & Mueller
Attys.

V. M. HARRIS.
REFLEX CAMERA.
APPLICATION FILED SEPT. 23, 1918.

1,352,449.

Patented Sept. 14, 1920.
3 SHEETS—SHEET 2.

Inventor
Vaman M. Harris
by Zabel + Mueller
Attys.

V. M. HARRIS.
REFLEX CAMERA.
APPLICATION FILED SEPT. 23, 1918.
1,352,449.
Patented Sept. 14, 1920.
3 SHEETS—SHEET 3.
Fig. 6.
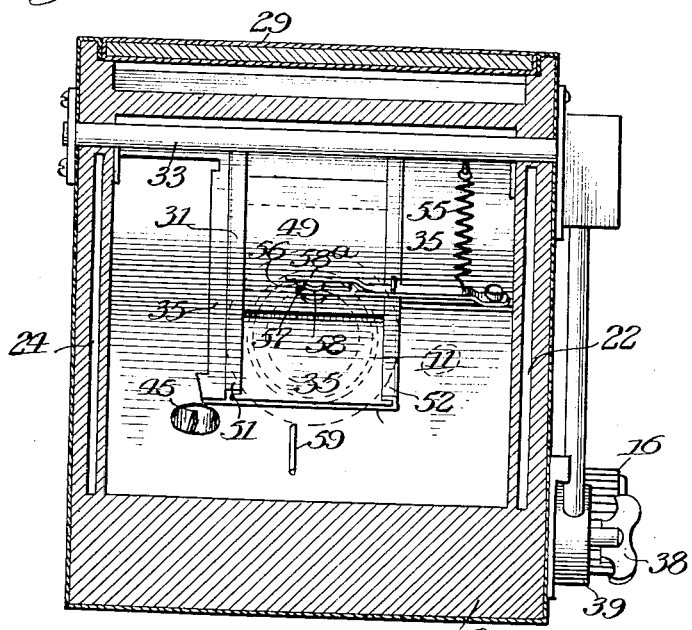
Fig. 7.
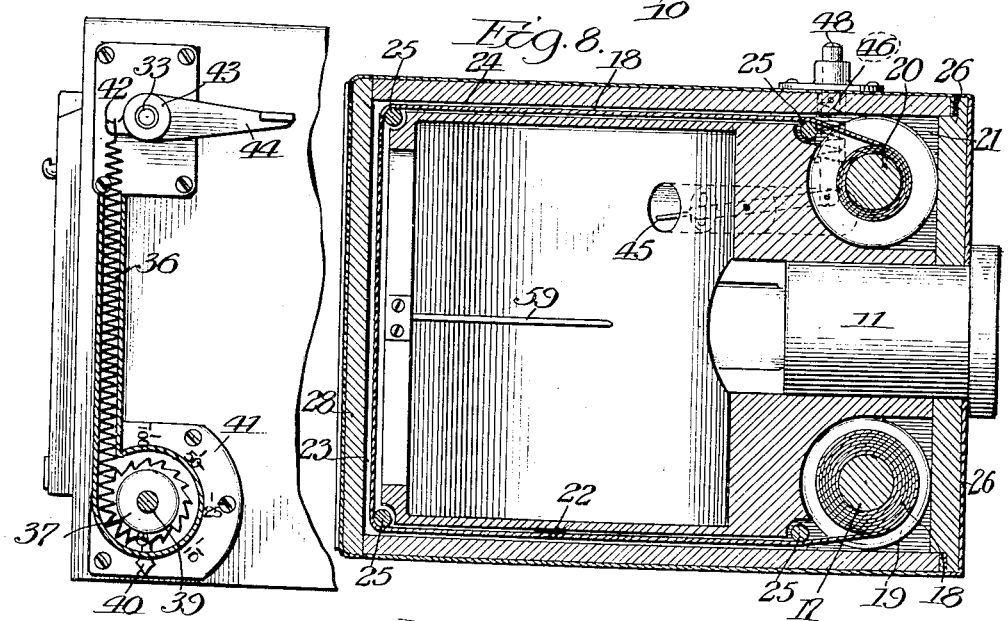
Fig. 8.
Inventor
Varian M. Harris
by Zabel & Mueller Attys.

UNITED STATES PATENT OFFICE.

VARIAN M. HARRIS, OF CHICAGO, ILLINOIS, ASSIGNOR, BY MESNE ASSIGNMENTS, TO POPULAR REFLEX CAMERA CORPORATION, OF CHICAGO, ILLINOIS, A CORPORATION OF ILLINOIS.

REFLEX CAMERA.

1,352,449.     Specification of Letters Patent.     Patented Sept. 14, 1920.

Application filed September 23, 1918. Serial No. 255,260.

*To all whom it may concern:*

Be it known that I, VARIAN M. HARRIS, a citizen of the United States, residing at Chicago, in the county of Cook and State of Illinois, have invented a certain new and useful Improvement in Reflex Cameras, of which the following is a full, clear, concise, and exact description, reference being had to the accompanying drawings, forming a part of this specification.

My invention relates to photographic devices and has for its object the provision of a new and improved device of this character.

One of the features of my invention concerns itself particularly with the provision of a simple and reliable mechanism so that the device may be used as what is known as a reflex camera. By this I mean that the image may be seen by the operator upon a screen in its natural normal condition and size identically as the image will be taken by the sensitized element.

I will explain one form which my invention may take more in detail by referring to the accompanying drawings, in which—

Fig. 6 is a similar view showing the shutter control mechanism in its limiting alternative position;

Fig. 7 is a fragmentary side view showing the time control mechanism; and

Fig. 8 is a longitudinal sectional view illustrating the arrangement of the film together with its spools.

Figure 1:
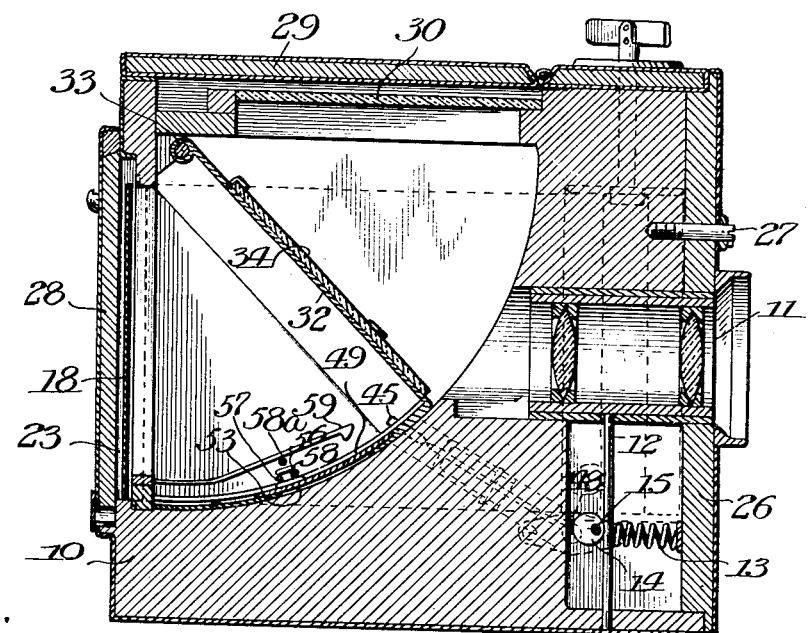
Figure 1 is a longitudinal sectional view of a device constructed in accordance with my invention.

Referring more particularly to Fig. 1, I show a box structure 10 within which all of the apparatus is carried. At the forward end of this box structure the lens 11 is slidably mounted for focal adjustment. In order to focus this slidably mounted lens structure, I provide a rod 12 which is swingingly carried in the box structure 10 so that it may swing from the position shown in full lines in Fig. 3 to the position shown in dotted lines. The rod 12 enters a small opening provided in the lens structure so that the lens structure moves in and out as the rod 12 is moved between its limiting positions. A spring 13 normally presses the rod 12 against a cam 14, this cam being mounted upon the shaft 15. The shaft 15 is operated by the knurled finger piece 16, shown more clearly in Fig. 2.

One of the elements of advantage of thus mounting the focusing apparatus is due to the elimination of rack and pinion or similar mechanisms with which, when they are used, it is necessary to reverse the operation of the finger piece, should the lens be moved beyond its proper position when focusing. With the structure as here described the finger piece 16 need be rotated in only one direction of rotation for the reason that should the lens structure 11 be moved beyond its proper position, then the operator continues the rotation of the finger piece 16 in the same direction of rotation, whereupon the lens structure 11 moves to its limiting position and then is retracted due to the interaction between the spring 13 and cam 14. No reversal of movement of the finger piece 16 is thus required.

Figure 2:
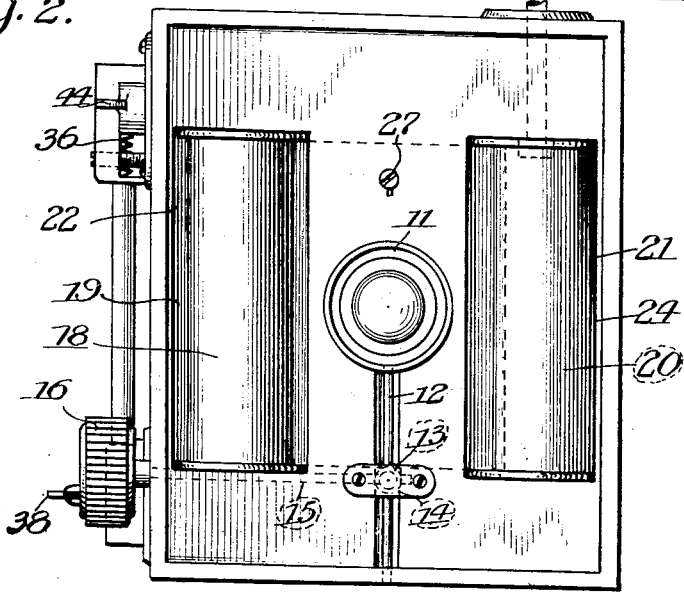
Fig. 2 is a front view thereof.

By referring to Figs. 2 and 8, it will be noted that the roller 17 carrying the film 18 finds suitable lodgment within a recess 19 provided for its reception. A take-up roll 20 is mounted in a similar recess 21 on the opposite side of the lens structure 11. The film is led backwardly through a slot 22 provided in the side of the box structure 10. The slot 22 communicates rearwardly with the slot 23 through which the film 18 passes and the film is then directed through a further slot 24 provided in the opposite side of the box structure 10, from whence the film then passes about the take-up roll 20. Suitable rollers 25 are provided to guide the film in its passage through the slots 22, 23, and 24. The advantage of thus mounting the film roll and take-up roll forwardly of the lens structure will be apparent when it is noted that in thus mounting these parts they can be carried entirely within the box structure and away from the operating parts to the rear of the lens. This mounting of the film rolls is made the subject matter of a copending application, Serial No. 278,275 filed February 20, 1919. A front cover plate 26 is provided suitably held in place by the locking screw 27. A rear cover plate 28 suitably snapped into position closes the rear of the box structure 10. A hinged lid 29 which may be opened and closed at will discloses to view when opened the ground glass 30 upon which the image is thrown during the focusing operation.

Between the lens structure 11 and the film 18 appearing in the slot 23 shutter control mechanism 31 is provided which when actuated permits the light from the object to be thrown upon the exposed film. This shutter control mechanism has provision whereby it may be adjusted so as to regulate the time of exposure. This shutter control mechanism consists of a plate 32 pivoted upon the shaft 33 and carrying at its free extremity the section of cylindrical plate or shutter carrier 35. On top of the plate 32 there is mounted a mirror 34. When this shutter is in the position shown in Fig. 1, the light as it enters through the lens structure 11 is thrown by the mirror 34 directly upon the ground glass 30 where it may be noted by the operator when the lid 29 is open. It will be noted that the ground glass 30 is, relatively speaking, the same distance from the lens structure as the film 18 in the slot 23, both being at the focal point of the lens. Normally, the shutter control structure would occupy the position shown more clearly in Fig. 6, at which time the plate 32 is in its uppermost position. This position it occupies due to the action of a spring 36 whose tension may be regulated by winding it about a drum 37 in answer to the rotation of the finger piece 38, the finger piece 38 being fastened to the shaft 39 which carries the drum 37. The tension of the spring controls the speed of ascent of this shutter control mechanism from the position which it is shown occupying in Fig. 1 to the position it is shown occupying in Fig. 6. A suitable pointer 40 operable along a graduated scale 41 indicates to the operator the time limit of the exposure depending upon the adjustment of the spring 36. The spring 36 at its free extremity engages a finger 42 which projects from the hub 43 fixedly mounted upon the shaft 33.

Figure 4:
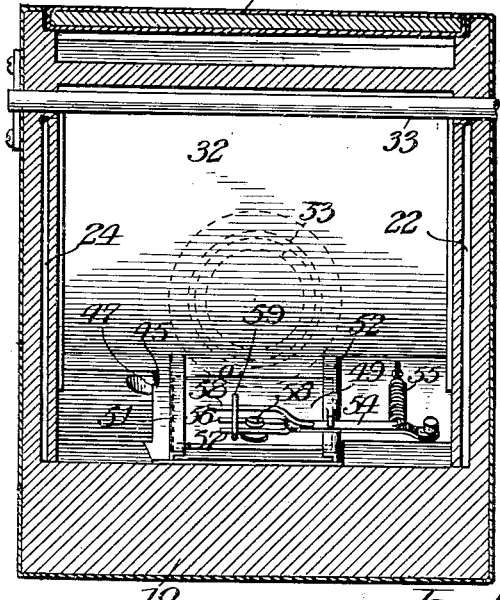
Fig. 4 is a rear view partially in section illustrating the shutter control mechanism in its initial position.

Now, whenever it is desired to move the shutter control mechanism from the position it occupies in Fig. 6, the lever 44 (Fig. 7) is rotated in a clockwise direction, thereupon rotating the shaft 33 and bringing the shutter control mechanism into the position shown in Figs. 1 and 4. When the shutter control mechanism is in that position, a tripper finger 45 suitably controlled by a spring 46 enters into a notch 47 and holds the shutter control mechanism in the position of Fig. 1. This tripper finger 45 is controlled by a plunger 48 so that whenever the plunger 48 is pressed inwardly, the tripper finger 45 is removed from the notch 47 to permit the spring 36 to throw the shutter control mechanism from the position it occupies in Fig. 1 to the position it occupies in Fig. 6. During the passage of the shutter control mechanism from its starting to its limiting position a suitable shutter 49 is temporarily actuated so as to present an aperture through the otherwise opaque plate 35. This plate 35 normally closes the opening 50 through which the light must pass from the lens structure and it is only during the movement of the shutter control mechanism from its starting to its limiting position that the shutter 49 is temporarily actuated to present an opening between the lens structure and the film 18. The shutter 49 is slidably mounted in grooves or ways 51 and 52 provided upon the plate 35. This plate 35 has a central opening 53 normally closed by the shutter 49. Suitable mechanism is provided to cause relative movement between the shutter 49 and its guides 51 and 52 during the time that the shutter control mechanism is moving from its starting to its limiting position, and this mechanism consists of the pivotally mounted arm 54 normally held in a retracted position by a spring 55, which arm has three fingers, two of which fingers, the fingers 56 and 57, are slidable upon opposite sides of the neck of a button 58 provided upon the shutter 49. A third finger 58$^a$ is slightly raised above the button and does not have any engagement therewith. A detent or shutter retarder 59 is provided which is adapted to coöperate with the finger 58$^a$ and to temporarily hold back this finger 58$^a$ together with the arm 54 and the shutter 49 as the plate 35 together with the plate 32 moves from its starting to its limiting position.

Figure 3:
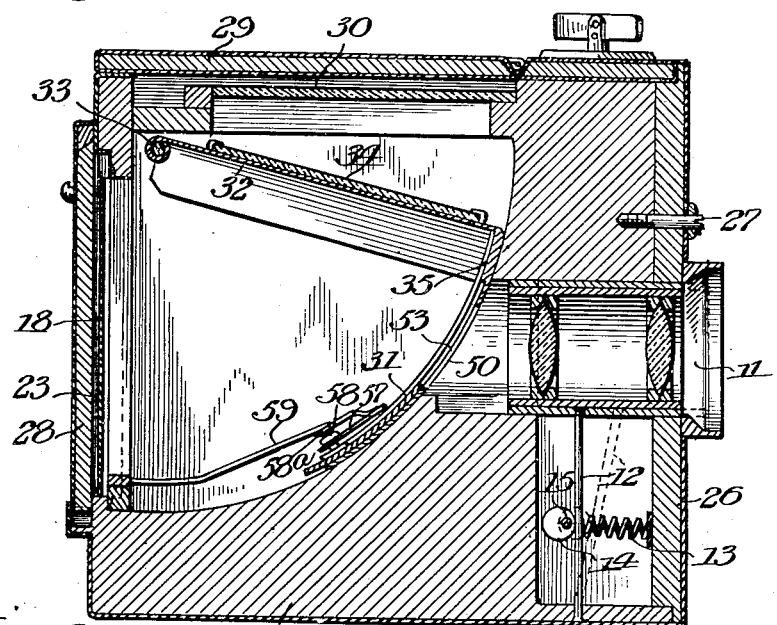
Fig. 3 is a view similar to Fig. 1 with the shutter control elements in an intermediate, *i. e.* taking position.
Figure 5:
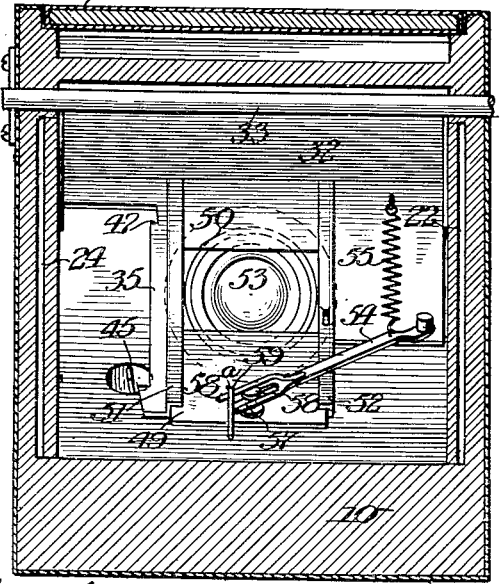
Fig. 5 is a view similar to Fig. 4 showing the shutter control mechanism in the same intermediate position that it occupies in Fig. 3.

It will be readily seen that as the shutter control structure moves beyond the point illustrated in Figs. 3 and 5, the detent 59 becomes disengaged from the finger 58$^a$ and permits the spring 55 to slide the shutter 49 along its ways back into the position where it closes the aperture 53. It will be apparent from this that whenever it is desired to take a picture, the shutter control mechanism is moved into the position shown in Fig. 1, whereupon the lid 29 is opened and the camera directed upon the object to be photographed. A picture of the object is, through the agency of the mirror 34, thrown upon the ground glass 30 in the same focal condition that this image would occupy if thrown upon the film 18. The operator then actuates the finger piece 16 to bring the object into its proper focus and adjusts the camera physically into position so that the image as shown upon the ground glass 30 is properly placed in the position that it is desired to have it occupy upon the film. The operator then presses the plunger 48, whereupon the tripper finger 45 releases the shutter control mechanism. The shutter control mechanism in answer to the pull of the spring 36 swings upwardly with the shaft 33 until the finger 58 engages the detent 59. The shutter control mechanism continues its upward movement with the exception of the shutter 49 which is temporarily retained by the detent 59 so as to open the aperture 53. The opening of the aperture 53 permits the light to act upon the sensitized film 18. The further upward movement of the shutter control mechanism permits the release of the shutter 49 to again close the aperture 53, the picture having in the meantime been taken. As before stated, the speed of ascent of the shutter control mechanism may be regulated in any suitable manner as, for instance, by adjusting the tension of the spring 36. It will be noted that conjointly as the shutter control mechanism is tripped to bring the mirror out of the path of the rays of light passing through the lens, certain instrumentalities are brought into play to actuate the shutter, which permits the action of the light upon the sensitized element such as the film here shown.

In the claims I have designated the ground glass 30 as a focusing screen, not only to include such a ground glass structure but also any and all of its equivalents.

From the description thus given the nature of my invention will be readily clear to those skilled in the art. It will also be apparent that many modifications may be made without departing from the spirit of my invention.

Having thus however described one specific form which my invention may take, what I claim as new and desire to secure by Letters Patent is:

1. In a photographic camera adapted to hold a sensitized element in position for exposure, the combination with a lens structure, a focusing screen, means adapted when interposed between said lens structure and said sensitized element to reflect the image upon the focusing screen, shutter mechanism adapted for periodic interposition between said lens structure and said sensitized element, and means for causing a conjoint actuation of said reflecting means and said shutter mechanism, said last aforesaid means including a shutter retarder.

2. A photographic camera adapted to hold a sensitized element in position for exposure, and including a focusing screen, an image reflector obliquely interposed between the focusing screen and sensitized element, means for moving the reflector from its interposed position to a position of rest to clear the sensitized element, a normally closed shutter, and means for opening and closing the shutter during movement of the reflector before it reaches its position of rest.

3. A photographic camera adapted to hold a sensitized element in position for exposure, and including a focusing screen, an image reflector obliquely interposed between the focusing screen and sensitized element, means for moving the reflector from its interposed position to a position of rest to clear the sensitized element, a normally closed shutter movable with the reflector, and means for opening the shutter during movement of the reflector.

4. A photographic camera adapted to hold a sensitized element in position for exposure, and including a focusing screen, an image reflector interposed between the focusing screen and sensitized element, spring actuated means for moving the reflector from its interposed position to impact with a stop in a position of rest, a normally closed shutter, and means for automatically opening and closing the shutter during movement of the reflector before the impact.

5. A photographic camera adapted to hold a sensitized element in position for exposure, and including a lens, a focusing screen, a reflector interposed between the lens and sensitized element for reflecting the image upon the focusing screen, a shutter, and means for moving the reflector from its interposed position and opening and closing the shutter during the movement of the reflector.

6. A photographic camera adapted to hold a sensitized element in position for exposure, and including a focusing screen, an image reflector interposed between the screen and sensitized element, a mounting for the reflector, a normally closed shutter carried by the mounting, means for releasing the reflector and mounting to move from the interposed position to clear the sensitized element, and a detent in the path of the shutter for causing its operation during said movement of the reflector and mounting.

7. A photographic camera adapted to hold a sensitized element in position for exposure, and including a focusing screen, a lens, an image reflector and mounting interposed between the lens and screen and obliquely between the lens and sensitized element, a shutter carried by said mounting and movable therewith, means for releasing the mounting and reflector whereby it is moved from the interposed position to clear the sensitized element, tripper mechanism in the path of the shutter to open it during said movement of the reflector and mounting, and means for again closing the shutter during said movement.

8. A photographic device of the character described adapted to hold a sensitized element in position for exposure and having a lens structure, a focusing screen, an image reflector movable between limiting positions and adapted in one position to reflect the image upon the screen, a shutter carrier movable with said image reflector, a shutter carried thereby, and means for opening and closing said shutter during the movement of said reflector and carrier from one limiting position to the other.

9. A photographic device of the character described adapted to hold a sensitized element in position for exposure and having a lens structure, a focusing screen, an image reflector movable between limiting positions and adapted in one position to reflect the image upon the screen, a shutter carrier movable with said image reflector, a shutter carried thereby and normally biased toward closed position, and means for opening said shutter during the movement of said reflector and carrier from one limiting position to the other.

10. A photographic device of the character described adapted to hold a sensitized element in position for exposure and having a lens structure, a focusing screen, an image reflector movable between limiting positions and adapted in one position to reflect the image upon the screen, a shutter carrier movable with said image reflector and forming a unitary structure therewith, a closed shutter carried thereby, and means for momentarily opening said shutter during the movement of said reflector and carrier from one limiting position to the other.

11. A photographic device of the character described adapted to hold a sensitized element in position for exposure and having a lens structure, a focusing screen, an image reflector movable between limiting positions and adapted in one position to reflect the image upon the screen, a shutter carrier movable with said image reflector, a shutter carried thereby, means for opening and closing said shutter during the movement of said reflector and carrier from one limiting position to the other, and means for controlling the length of exposure.

12. A photographic device of the character described adapted to hold a sensitized element in position for exposure and having a lens structure, a focusing screen, an image reflector movable between limiting positions and adapted in one position to reflect the image upon the screen, a shutter carrier movable with said image reflector, a shutter carried thereby, a spring to hold the shutter in closed position means for opening said shutter during the movement of said reflector and carrier from one limiting position to the other, and means for controlling the speed of ascent of said reflector and carrier.

13. A photographic device of the character described adapted to hold a sensitized element in position for exposure and having a lens structure, a focusing screen, an image reflector movable between limiting positions and adapted in one position to reflect the image upon the screen, a shutter carrier movable with said image reflector, a shutter carried thereby, means to close the shutter and means for opening said shutter during the movement of said reflector and carrier from one limiting position to the other, said means including a stop and a finger for controlling said shutter for periodically engaging said stop.

14. A photographic device of the character described adapted to hold a sensitized element in position for exposure and having a lens structure, a focusing screen, an image reflector movable between limiting positions and adapted in one position to reflect the image upon the screen, a shutter carrier movable with said image reflector, a shutter carried thereby, means for opening said shutter during the movement of said reflector and carrier from one limiting position to the other, means for closing the shutter, and means for completely arresting the movement of said reflector in an intermediate position.

In witness whereof, I hereunto subscribe my name this 13th day of September, A. D., 1918.

VARIAN M. HARRIS.